United States Patent [19]  [11] Patent Number: 5,638,399
Schuchman et al.  [45] Date of Patent: Jun. 10, 1997

[54] MULTI-BEAM SATELLITE COMMUNICATION SYSTEM WITH USER TERMINAL FREQUENCIES HAVING TRANSCEIVERS USING THE SAME SET OF FREQUENCY HOPPING

[75] Inventors: Leonard Schuchman; Aaron Weinberg, both of Potomac, Md.; Ronald Bruno, Arlington, Va.

[73] Assignee: Stanford Telecommunications, Inc., Reston, Va.

[21] Appl. No.: 341,869

[22] Filed: Nov. 15, 1994

[51] Int. Cl.$^6$ ............... H04B 15/00; H04K 1/04; H04L 27/30
[52] U.S. Cl. ............ 375/202; 375/285; 380/34; 455/13.2; 455/33.1; 370/320; 370/321
[58] Field of Search ................... 375/202, 200, 375/206, 205, 367; 380/34, 48, 33, 39, 40; 370/18, 95.3, 50, 19; 379/59; 331/25, 16, 17; 455/33.1, 13.2, 13.3

[56] References Cited

U.S. PATENT DOCUMENTS

| | | | |
|---|---|---|---|
| 4,901,307 | 2/1990 | Gilhousen et al. | 370/18 |
| 4,914,699 | 4/1990 | Dunn et al. | 380/34 |
| 5,073,900 | 12/1991 | Mallinckrodt | 375/205 |
| 5,283,780 | 2/1994 | Schuchman et al. | 370/50 |
| 5,339,330 | 8/1994 | Mallinckrodt | 375/205 |
| 5,430,759 | 7/1995 | Yokev et al. | 375/202 |
| 5,452,319 | 9/1995 | Cook et al. | 375/202 |
| 5,454,009 | 9/1995 | Fruit | 375/202 |
| 5,463,659 | 10/1995 | Nealon et al. | 375/202 |
| 5,511,233 | 4/1996 | Oten | 455/56.1 |

OTHER PUBLICATIONS

Newton, Newton's Telecom Dictionary, pp. 218 and 1012. 1994.

*Primary Examiner*—Wellington Chin
*Assistant Examiner*—William Luther
*Attorney, Agent, or Firm*—Jim Zegeer, Esq.

[57] ABSTRACT

The satellite radio communication system of this invention provides communication between one or more service centers and an ensemble of fixed and mobile user terminals. One or more earth orbiting satellites are provided with each satellite having transmitter forming a down-link channel which is slow frequency hopped, and a multi-beam antenna system with a single channel per beam to time division multiple broadcast signals to all user terminals covered by each said beam, respectively. Each user terminal includes a transceiver for receiving a down-link channel broadcast from the one of said beams in whose path it lies, and a return link comprised of a dedicated narrow band broadcast channel with slow frequency hopping of down-link channel. There is a fixed set of frequencies through which the frequency hopping is carried out, with the plurality of fixed and mobile user terminals using the same set of frequency hopping frequencies. Mutually synchronized transmissions from each user is such that while the ensemble of users display the same set of frequency hopping frequencies, each user in said ensemble of fixed and mobile user terminals employs a unique frequency at each instant of time.

16 Claims, 8 Drawing Sheets

- N return channels supported by N frequencies: Up to N users frequency hop in time coordination - provides BW efficiency of SCPC with multipath protection of FH

- Pre-Assigned and Demand-Assigned Service:
  - PA: Pre-assigned by schedule
  - DA: Dynamically assigned in response to either UT or customer request
  - RA: Random Access slots for spontaneous UT reporting events (e.g., emergencies)

FIG. 3

- Each 1 second slot is composed of 15 frequency dwells spread over 11 separate frequencies

- Consecutive frequencies generated by:

$f_n \rightarrow f_{\mod 11(n+7)}$
  current  next

- Initial hop of 1 second frames is distributed over all frequencies

Each hop provides 9 bytes (72 bits) + 1 byte (8 bits) as reference + guard time.

FIG. 6

| Hop# | 1/2 Byte Time Guard Band | 1 | 2 | 3 | Sync and Coded Bytes | | | | | | 1/2 Byte Time Guard Band |
|---|---|---|---|---|---|---|---|---|---|---|---|
| | | | | | 4 | 5 | 6 | 7 | 8 | 9 | |
| 1 | | SYNC | SYNC | SYNC | 38 | 53 | 68 | 83 | 98 | 113 | |
| 2 | | SYNC | SYNC | SYNC | 39 | 54 | 69 | 84 | 99 | 114 | |
| 3 | | SYNC | SYNC | SYNC | 40 | 55 | 70 | 85 | 100 | 115 | |
| 4 | | 1 | 13 | 25 | 41 | 56 | 71 | 86 | 101 | 116 | |
| 5 | | 2 | 14 | 26 | 42 | 57 | 72 | 87 | 102 | 117 | |
| 6 | | 3 | 15 | 27 | 43 | 58 | 73 | 88 | 103 | 118 | |
| 7 | | 4 | 16 | 28 | 44 | 59 | 74 | 89 | 104 | 119 | |
| 8 | | 5 | 17 | 29 | 45 | 60 | 75 | 90 | 105 | 120 | |
| 9 | | 6 | 18 | 30 | 46 | 61 | 76 | 91 | 106 | 121 | |
| 10 | | 7 | 19 | 31 | 47 | 62 | 77 | 92 | 107 | 122 | |
| 11 | | 8 | 20 | 32 | 48 | 63 | 78 | 93 | 108 | 123 | |
| 12 | | 9 | 21 | 33 | 49 | 64 | 79 | 94 | 109 | 124 | |
| 13 | | 10 | 22 | 34 | 50 | 65 | 80 | 95 | 110 | 125 | |
| 14 | | 11 | 23 | 35 | 51 | 66 | 81 | 96 | 111 | 126 | |
| 15 | | 12 | 24 | 36 | 52 | 67 | 82 | 97 | 112 | 127 | |

- Data read-in down each column
- Data read-out by row
- Each of 9 middle columns contains 8 bit bytes
- 1st and last columns contain 1/2 byte guard time for UT-to-satellite range differences
- Sync byte is augmented 7 bit Barker sequence
- Total of 1 sec @ 1200 bps

FIG. 7

| Link Component | Value | Comment |
|---|---|---|
| User Power (dBw) | 0.0 | 1Watt |
| Antenna Gain (dB) | 2.5 | Non-steerable CONUS antenna; 20°-65° elevation angle |
| Path loss(dB) | 189.2 | |
| User G/T (dB/°K) | 2.7 | AMSC Value |
| Boltzman's Constant | -228.6 | |
| C/No (dB-Hz) | 44.6 | |
| Receiver Implementation Loss (dB) | 2.0 | Assumption for State-of-the-Art Low-Data Rate Receiver |
| E/No for 1200 Bps (dB) | 11.8 | |
| Required E/No (dB) | 6.0 | • DPSK and ~ 0.01 channel bit error rate<br>• Leads to error-free operation with R-S coding |
| Margin (dB) | 5.8 | |

MULTI-BEAM SATELLITE COMMUNICATION SYSTEM WITH USER TERMINAL FREQUENCIES HAVING TRANSCEIVERS USING THE SAME SET OF FREQUENCY HOPPING

BACKGROUND OF THE INVENTION

Enormous activity has taken place in recent years, and resources expended, towards defining a broad range of near-term and future satellite communication (satcom) systems and services. These services, which may be provided or regional or global bases, accommodate both stationary and mobile users, and range in sophistication from one-way paging and messaging, to two-way high-quality voice. During recent years, activities have also included many filings with the FCC in order to receive approval to proceed with development, launch, and operations by the mid-to-late 1990's.

DESCRIPTION OF THE PRIOR ART

The concepts proposed have been quite diverse and encompass:

1. Low Earth orbits (LEO)—e.g., Motorola's Iridium, Loral's Globalstar, and Orbital Sciences ORBCOMM—which propose operational constellations with satellite quantities ranging from 26 to 66.

2. Medium Earth Orbits (MEO)—e.g., TRW's Odyssey—which propose operational constellations with satellite quantities on the order of 12.

3. Geosynchronous Orbits (GEO)—e.g., American Mobile Satellite's MSAT in geostationary orbit—which either provide regional coverage, or would require on the order of 4 to 5 satellites for global coverage at latitudes up to 70°.

Critical ingredients of each system design are the signal and message structures, to ensure:

1. Robust communications over the broadest possible range of stationary and mobile environments. The desirable environments encompass rural, suburban, and urban, each of which introduces a specific form of multipath that uniquely degrades communications performance.

2. High system capacity, in terms of the maximum number of users that can simultaneously receive the desired level of service (e.g., voice, data, paging). While the ORBCOMM system focuses on one-way and two-way data transmissions, a major emphasis of most of the emerging systems is two-way voice communications.

3. A user transceiver that is as power-efficient and low-cost as possible.

4. Operational and evolution flexibility, so that the system can be applied to a diverse user base and can flexibly expand as user demand grows.

Based on filing data associated with each of the emerging systems, the signal structures employed fall into one of the following categories:

1. Single Channel Per Carrier (SCPC), Frequency Division Multiple Access (FDMA). SCPC/FDMA reflects the simplest and most efficient use of spectrum, but offers no multipath mitigation. As such its use is limited to the most benign (or controlled) environments, to scenarios that can afford los of data due to multipath, or to scenarios that can take adequate advantage of some form of diversity (e.g, due to multiple, simultaneously visible LEO's). ORBACOMM is an example of a system that plans to use FDMA/SCPC, as is the current plan of AMSC.

2. Time Division Multiple Access (TDMA). TDMA provides very efficient use of satellite power, but is not as spectrally efficient as SCPC/FDMA. As for SCPC/FDMA, however, multipath mitigation is not inherent in the signal structure, and must arise from some form of diversity. IRIDIUM is a system that plans to use TDMA.

3. Direct-Sequence/Code Division Multiple Access (DS/CDMA). This is a form of spread-spectrum that permits multiple users to simultaneously use the same portion of spectrum, without mutual interference, as long as the number of simultaneous users and their power levels are properly controlled. A suitably structured DS/CDMA waveform also inherently provides multipath protection, especially when combined with proper receiver processing. These features, when combined with the simplicity of operation (e.g, no time synchronization required as in TDMA), make DS/CDMA an increasingly popular waveform for satcom and cellular communications. A significant disadvantage of DS/CDMA is its spectral inefficiency, as compared to SCPC/FDMA and TDMA, especially if user-to-satellite transmit power levels are not carefully controlled. Emerging systems, such as Odyssey and Globalstar, plan to employ DS/CDMA.

The objective of this invention is to provide an improved satellite radio communication system—whose satellites may be in LEO, MEO, or GEO orbits—that primarily focuses on data collection applications and uniquely employs an alternative, novel signaling approach not addressed to date by any other proposed commercial satcom system. The novel signaling approach is an extension of applicant's satellite broadcast waveform (see U.S. Pat. No. 5,283,780, incorporated herein by reference).

BRIEF SUMMARY OF THE INVENTION

The satellite radio communication system of this invention provides communication between one or more service centers and an ensemble of fixed and mobile user terminals. One or more earth orbiting satellites are provided with each satellite having transmitter forming a down-link channel which is slow frequency hopped, and a multi-beam antenna system with a single channel per beam to time division multiple-access broadcast signals to all user terminals covered by each said beam, respectively, each user terminal includes a transceiver for receiving a down-link channel broadcast from the one of said beams in whose path it lies, and a return link comprised of a decided narrow band broadcast channel with slow frequency hopping of down-link channel. There is a fixed set of frequencies through which the frequency hopping is carried out, with the plurality of fixed and mobile user terminals using the same set of frequency hopping frequencies. Mutually synchronized transmission from each user is such while the ensemble of users display the same set of frequency hopping frequencies, each user in said ensemble of fixed and mobile user terminals employs a unique frequency at each instant of time.

The system of interest is termed Data Collection Satellite System (CACSS). Unique satellite system features of this invention include the following:

1. Substantially Asymmetric Data Communications. The principal emphasis is on data transfer from a large community of users. In other words, many user-to-satellite channels are employed for data transfer, while very little date need be transmitted to each user.

2. Broad Applicability. The system of this invention is applicable to arbitrary satellite orbits, and supports communications with stationary or mobile suers, under highly diverse environmental conditions (i.e., urban, rural, suburban), which encompass both frequency-selective and flat fading multipath conditions.

3. Unique Waveform That Inherently Provides Diversity, Multipath Protection, and Overall Robustness. The radio frequency (RF) waveform uniquely combines: slow frequency hopping (FH), block interleaving, and forward error correction (FEC). Note that FH has not been proposed by any other emerging satcom system discussed above. Also, substantial interleaving is not employed in other systems to avoid objectionable processing delays for voice communications; for the data communication scenario here, the associated processing delay (e.g., on the order of 1 second) is of no consequence.

4. Bandwidth Efficiency. The FH signaling approach used herein is a form of spread spectrum that, as noted above, provides multipath protection as does DS/CDMA). In addition, however, the proposed FH approach provides spectral efficiency that very closely approaches that of ideal SCPC/FDMA; this is a distinct advantage relative to DS/CDMA and provides higher user capacity.

5. Flexible Modulation. The above waveform of interest may employ virtually any modulation approach—coherent, noncoherent, or deferentially coherent—with the specific modulation tailored to the specific application. For example, for particularly low-cost, short-burst transmissions, differential modulation may appropriately provide the proper compromise between transmit/receive simplicity and signal-to-noise ratio efficiency.

6. Range Ordering of Users. The operations concept incorporates a unique range-ordering of users, so that all users who are simultaneously transmitting reflect nearly identical user-to-satellite range. This ensures that the frequency hopped signals of simultaneously transmitting users do not overlap, thereby minimizing inter-hop guard times, thus enhancing data throughout and spectral efficiency.

7. Low Complexity FH Synchronization. The user transmission hopping rate is exactly equal to the hopping rate of the satellite downlink transmission. The system provides a continuous downlink satellite transmission, which permits the user to efficiently synchronize to the downlink hopping pattern, and uses the downlink hopping epochs as the epochs for uplink hopping. This eliminates the need for the user to maintain an accurate hopping clock, and when coupled with the above range ordering, ensures that two simultaneous user transmissions, with distinct hopping patterns, will not overlap and therefore not interfere.

8. Flexible Operations. The FH scheme also provides time slots to users that can be preassigned or demand assigned. Random access can also support, based on the FH synchronization approach noted in item 7, above.

9. Tracking Can Be Integrated. The system can combine both communications and accurate tracking via the integration of a commercial GPS receiver.

10. Small, Non-steerable, Separate Transmit/Receive Antennas on the User Terminal, That Provide Gain and Highly Attractive User-to-Satellite Directivity. For user Continental U.S. (CONUS) operations the antenna of interest provides highly attractive 5 dB of antenna gain, within an elevation angle contour of 20° to 65°. This eliminates the need for antenna steering, and further provides mitigation against multipath that is typically received at lower elevation angles. In addition, the use of separate planar array transmit/receive antennas (each one-half thick and housed in one small compact unit), for the half-duplex operational modes of interest to this invention, eliminates the need for a diplexer or a switch, thereby eliminating passive losses and further reducing cost. Furthermore, for areas outside of CONUS, or for other scenarios which require different operational elevation angles, the antennas of interest can be mounted to provide any "swath" of 45° elevation angles (e.g., between 45° and 90°).

11. All of the above is accomplished via low-complexity operations and a low-complexity user transceiver.

DESCRIPTION OF THE DRAWINGS

The above and other objects, advantages, and features of the invention will become more apparent when considered with the following specification and accompanying drawings wherein:

FIG. 3 illustrates a representative time/frequency approach for channel allocation for DACSS services, FIG. 4 describes illustrative forward/return link frequency hop (FH) signal parameters, FIG. 5 and FIG. 6 describe representative forward and return link FH scenarios, and emphasize the spectral efficiency of the critical return link FH approach, FIG. 7 describes an illustrative structure of the block interleaver, that is used in conjunction with FH to introduce diversity and multipath mitigation into the signal structure, FIG. 8 provides illustrative link power budgets for each of the communications links (forward and return) between the user and the satellite.

DETAILED DESCRIPTION OF THE INVENTION

The present invention introduces several unique system features that encompass:

1. Novel signalling, high bandwidth efficiency, and high capacity.

2. Protection against various forms of multipath.

3. Data collection support to a diverse community of suers, via satellites in arbitrary orbits.

4. Low complexity, highly flexible system operations.

Figure 1:
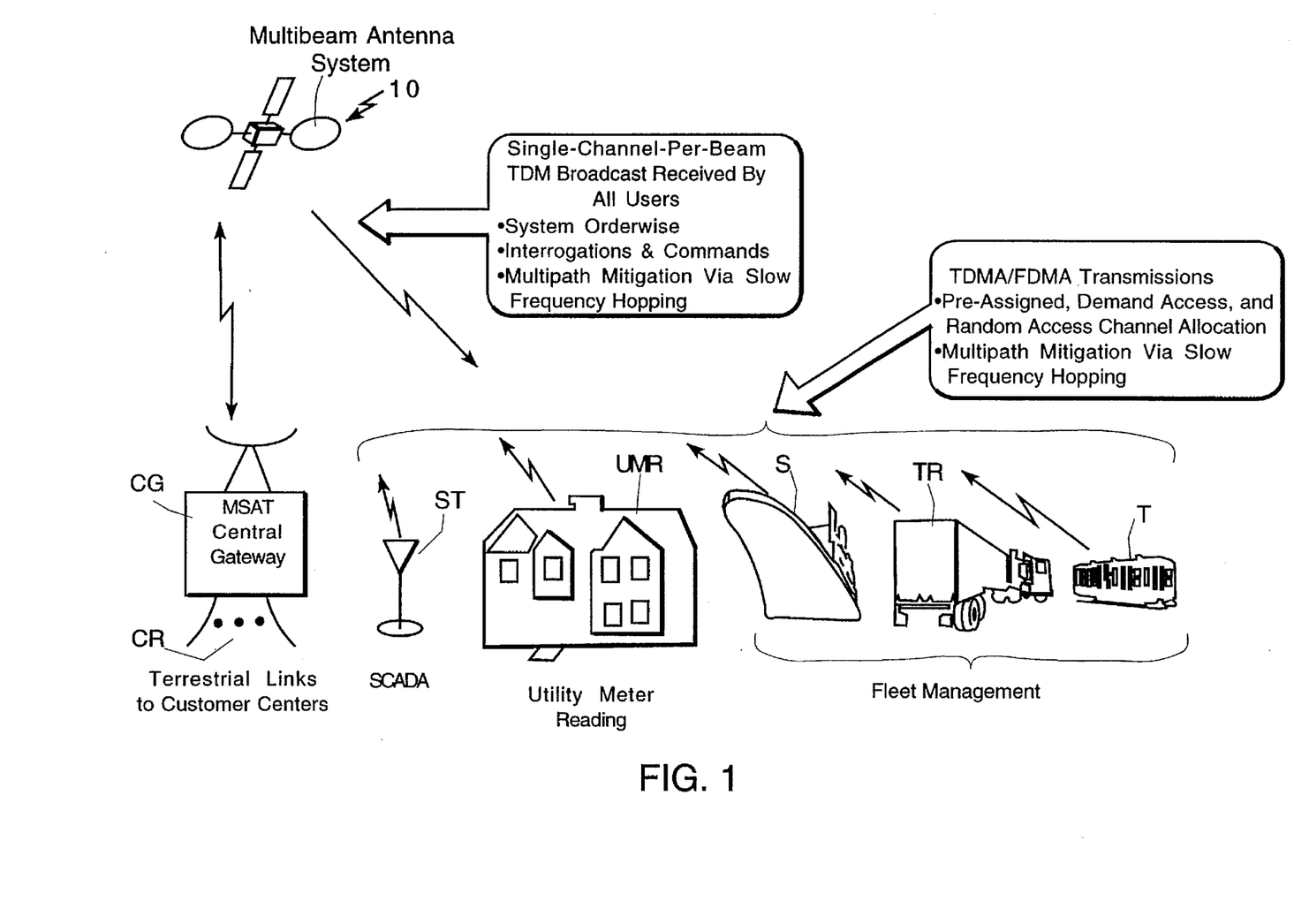
FIG. 1 provides an overview of the system architecture and the broad range of representative services that may be provided by the satellite system operations of this invention.

A high-level architecture overview is shown in FIG. 1, which also highlights the diverse set of services and user classes that can be accommodated:

1. Fleet management of trains T, trucks TR, ships S, or other vehicles, that may be supported under stationary or mobile conditions.

2. The automated transmission of utility meter readings UMR, with the emphasis on homes and businesses that are in sufficiently remote (e.g., rural) areas where it is costly to accomplish this function with human meter readers. Note that this represents a purely stationary communication scenario.

3. Automated, remote monitoring of pipe lines, scientific buoys, bridges and dams, and other stationary terminals ST that require low-duty-cycle supervisory control (SCADA). Monitoring of this nature generally relates to instrumentation in very remote areas, and an automated/low-duty-cycle satellite communication is thus highly attractive and cost-effective.

4. Search and rescue operations, which can be facilitated using GPS or other (AM, FM, TV) position location systems.

Figure 2:
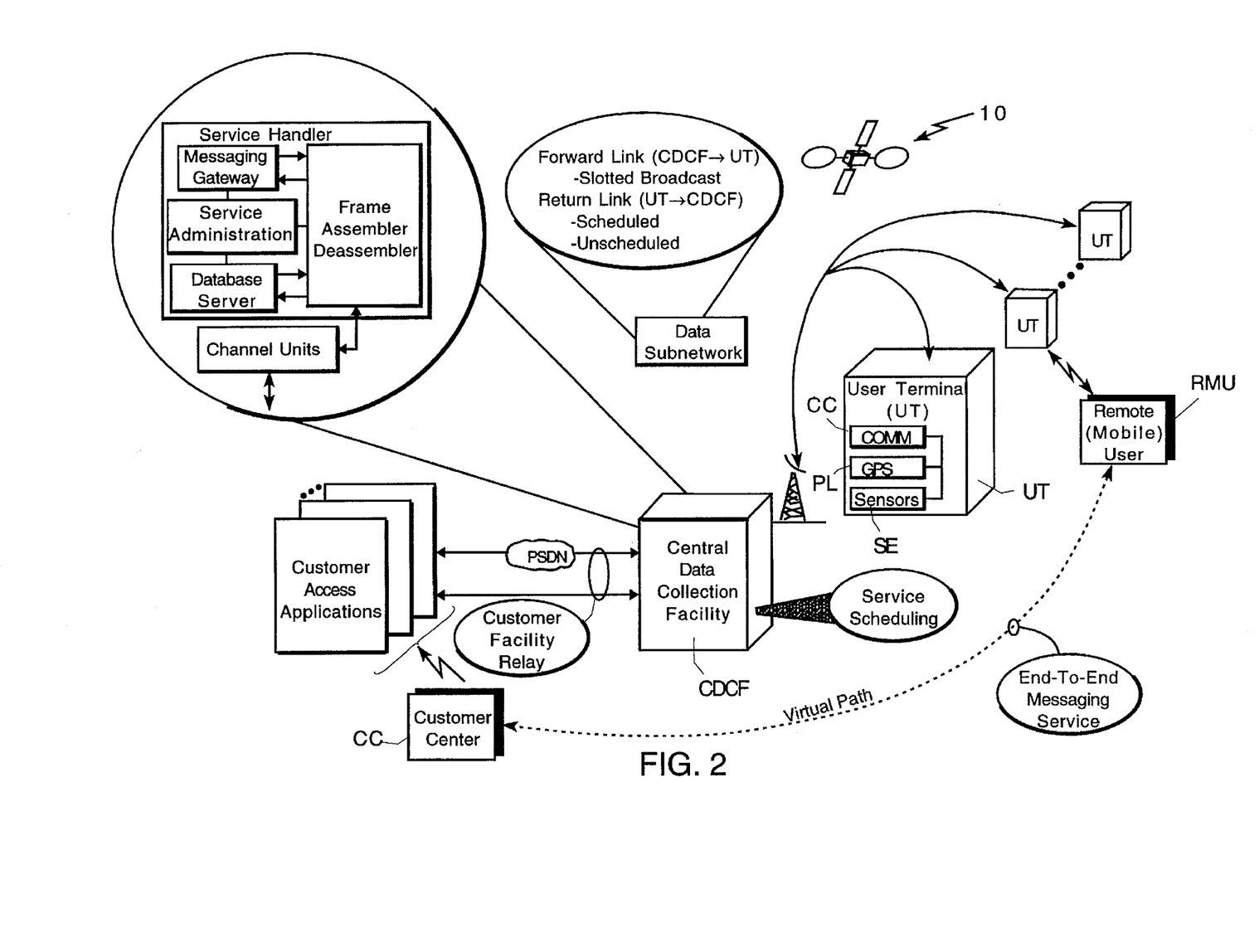
FIG. 2 illustrates the system elements, interfaces and data flow.

The system this accommodates is stationary and moving terminals. The principal ingredients and features of this architecture, which are illustrated in FIG. 1 and the companion FIG. 2, are the following:

1. The satellite 10 of interest may be in an arbitrary orbit. All two-way communications interfaces with the satellite's Central Gateway CG, which is connected to the end Customer Center via commercial terrestrial links CTL. FIG. 2 provides an expanded description of the system elements, interfaces and the flow of data between the user terminal UT and the customer center CC.

2. The user classes discussed above and shown in FIG. 1 encompass the range of stationary and mobile terminals. The user terminals UT may include one or more sensors SE, position location devices PL, such as a GPS receiver and a transceiver communication link CL. The user terminal UT can communicate with remote mobile users RMU via a separate radio communication channel.

3. A single channel time-division-multiplex (TDM) signal is broadcast on the "forward link" and received by the entire user population covered by each satellite antenna beam. The data transmitted includes both system-level and user-unique data. The crucial aspect here is that the quantity of data transmitted is low, so that only a single downlink channel is required to support all receiving user terminals (UT) in the path of the beam. In addition, the transmitted signal is slowly frequency hopped (FH), to provide significant mitigation of frequency-selective multipath fading. For the applications of interest the hopping rate is on the order of 10–50 Hz, which introduces very little implementation complexity.

4. On the UT-to-satellite uplink—termed the "return link"—many users may simultaneously transmit their unique data without mutual interference. This is accomplished by having each user transmit in a dedicated, narrowband channel—i.e., SCPC/FDMA is employed. To further provide multipath mitigation, slow FH is also employed. As described in detail later, the ensemble of users employ the same set of FH frequencies, but the user transmissions are mutually synchronized, so that each user employs a unique frequency at each time instant. In this manner, the unique scheme disclosed here maintains the high spectral efficiency of SCPC/FDMA, while simultaneously providing multipath mitigation. Also, note the unique asymmetrical nature of the communications, in that many return link signals are simultaneously transmitted, while only a single forward link signal is transmitted.

5. To minimize UT implementation complexity, the preferred embodiment of the invention employs the same FH rate on both the forward and return links. As such, each UT "listens" to the downlink and synchronizes to the hop timing. This derived hop timing then serves as the basis for the timing on the FH uplink; in other words, the UT does not require a built-in stable clock to provide accurate hop timing.

6. Another key operational ingredient is "range-ordering". The system scheduler—located in the Central Data Collection Facility (CDCF) at the gateway (FIG. 2)—schedules user transmissions in accordance with the user-to-satellite range, and regularly broadcasts the schedule to the users. Because UT hop timing is based on synchronization to the downlink, this range ordering ensures that user transmissions received by the satellite will not overlap immediately prior to, or immediately after a given frequency hop. It will be observed that this approach requires little or no guard time, thereby maximizing data throughput and spectral efficiency. This system feature is described in more detail later.

COMMUNICATIONS SIGNAL DESCRIPTION

This section provides detailed insight into this invention's unique communication signal structure. As discussed earlier, the users of interest typically transmit low-duty-cycle, low-data-rate messages. For such applications, a time-slotted message structure is uniquely applied in conjunction with FH to provide: efficient bandwidth utilization; high system capacity; and significant protection against multipath fading. This general message structure is highlighted in FIG. 3, and reflects the following key features:

1. The time slot duration is the same on the forward and return links. This introduces considerable operational simplicity, including simplified user synchronization to the hopping sequence. Such simplified synchronization is especially important for UT's that are "off" most of the time to conserve power, and periodically "wake-up" very briefly (e.g., for 1 minute or less every few hours).

Figure 3:
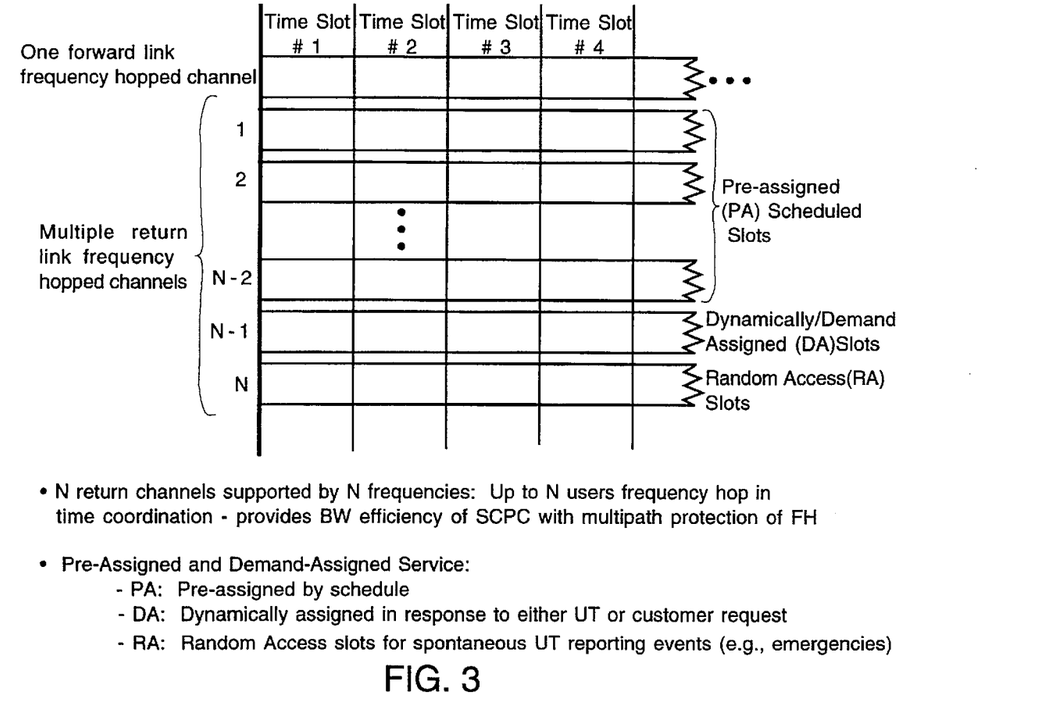

2. One FH channel is employed on the forward link, and N FH channels are employed on the return link. This reflects the unique asymmetric communications approach of this invention. As described below, the return link FH is accomplished in a manner which maximizes spectral efficiency and system capacity. Also, as indicated in FIG. 3, there is considerable flexibility in how the FH channels are employed, towards maximizing operational efficiency. In particular, the FH channels may be allocated in a highly flexible manner which permits three types of services:

a. Pre-assigned (PA) service, which are a priori scheduled. It is anticipated that the bulk of the user community will employ the PA service.

b. Dynamically-assigned (DA) service, which is not a priori scheduled, but is requested by the customer for some unanticipated need (e.g, to reconfigure the UT to increase its transmission duty-cycle). A small portion of the FH channel capacity would be allocated to DA service.

c. Random-access (RA) service, which would provide the UT with the ability to transmit, without the need for a channel allocation via the forward link. RA service, which should occur infrequently, might be required under emergency circumstances, or related situations which require the time-critical transmission of data.

Figure 4:
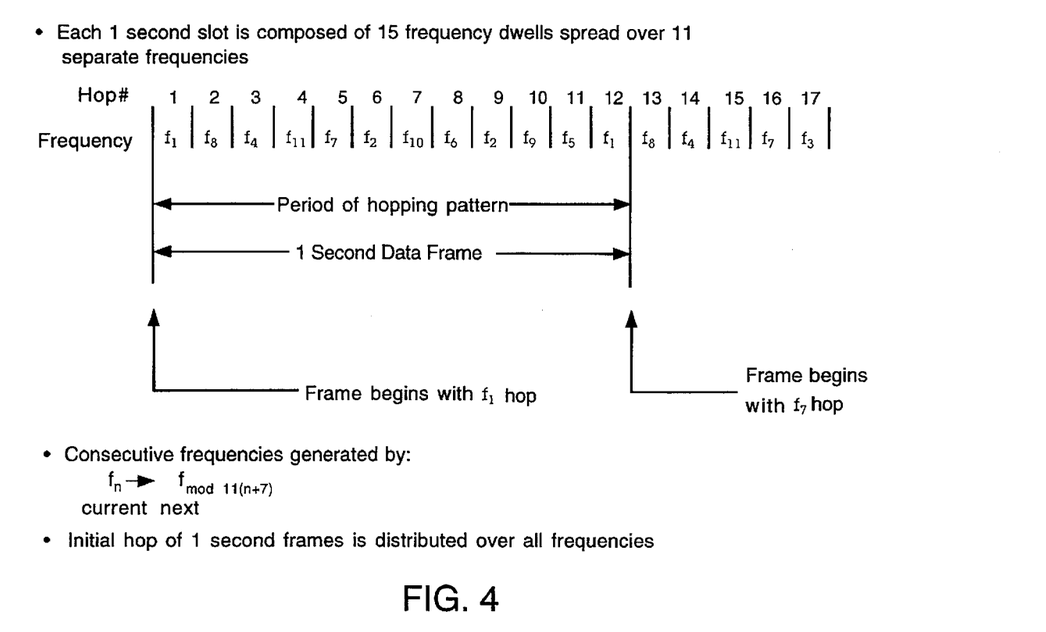

The remainder of this section provides detailed insight into unique signal structure and communication link aspects of the invention. While the scope of this invention is very broad and very flexible signal parameters may be employed, the discussion that follows uses illustrative parameters to enhance clarity. Toward this end, the illustrative FH parameters of FIG. 4 are employed:

1. The user time slot of FIG. 3 corresponds to a basic 1 second data frame, on both the forward and return links, with this one second encompassing multiple frequency hops. For the forward link, this one second frame would encompass the combination of system data and data directed to one or more users. For the return link, each user would employ the one second time slot with its unique data and with its unique frequency hopping pattern.

2. For this example, 11 distinct frequencies are employed on each of the forward and return links, but a total of 15 frequency hops are used to span the one second data frame. The prime relationship between the numbers 11 and 15 ensures that within each set of eleven successive one second data frames, each successive frame will start with a distinct frequency; as shown shortly, this will uniquely enhance frequency acquisition under multipath conditions.

Figure 5:
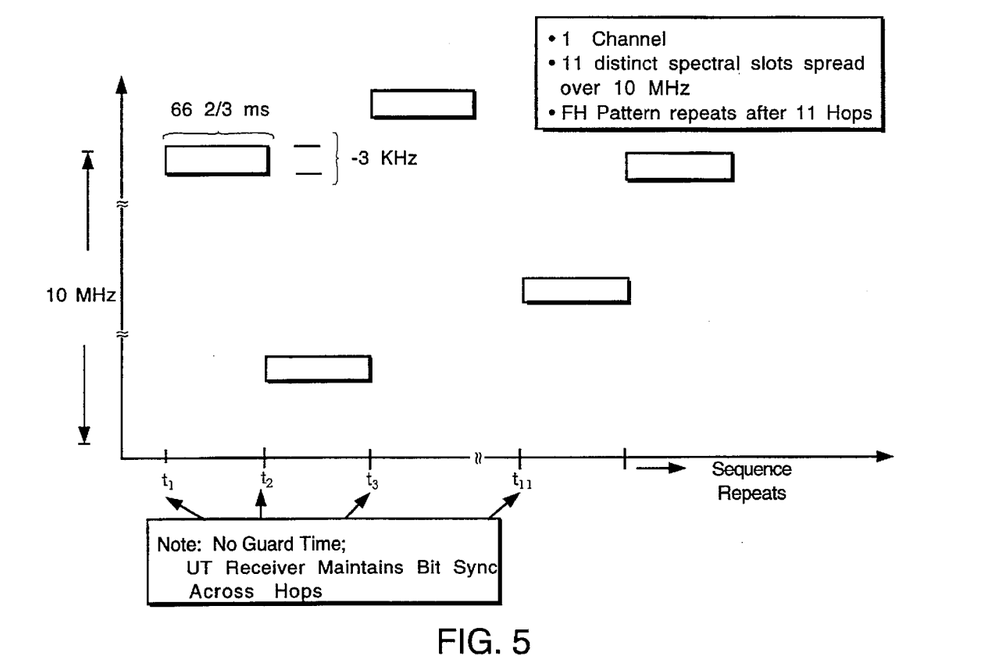

3. For the forward link and the example of FIG. 3, the FH scheme of this invention is illustrated in FIG. 5. As seen, the illustrative hop duration is 66⅔ ms, which corresponds to a 15 Hz hop rate, and corresponds to the use of 15 hops per 1 second data frame. Note that a specific hopping pattern occurs over the 11 frequencies used, with the pattern successively repeated. Also important are the following features:

a. The hopping frequencies are distributed over ~10 MHZ, so that the average spacing between neighboring frequencies is ~1 MHz. This is significant, because such a frequency spacing introduces frequency diversity by exceeding typical "coherence bandwidths", thereby leading to significant protection against frequency selective multipath fading.

b. Because only a single forward link channel is used, no guard time is required between channels. As such, a UT receiving the forward link signal will readily be able to continuously track the downlink signal across hops and across successive data frames.

c. For further illustrative purposes, the instantaneous bandwidth of each hop is taken as 3 kHz. This readily accommodates an illustrative channel bit rate of 1200 bps.

Figure 6:
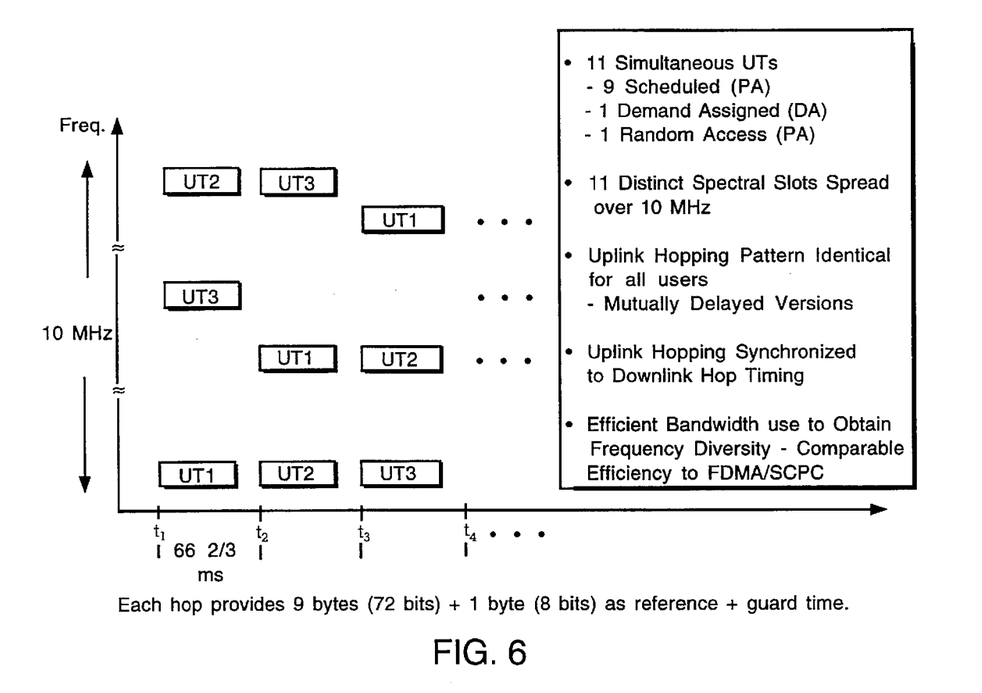

4. For the return link and the example of FIG. 3, the FH scheme of this invention is illustrated in FIG. 6. As seen, the same hop duration of 66⅔ ms is employed by each UT, as is the same 10 MHz frequency span to support the 11 hopping frequencies. For simplicity, only 3 of the 11 UT's are illustrated. The following features are important:

a. Each UT employs the same, but appropriately delayed, version of the hopping pattern. As such, in the example of FIG. 6, UT2 follows UT1, UT3 follows UT2, and so on, with the pattern repeating after 11 hops. As a consequence, for the 11 frequencies used here, 11 UT's can be simultaneously supported without mutual interference, thereby essentially achieving the maximum spectral efficiency achievable via SCPC/FDMA while simultaneously achieving the multipath protection benefits.

b. The eleven FH assignments may be flexibly applied to PA, D, and RA services. As an example here, 9 frequencies are applied to PA, and 1 each to DA and RA. It should be noted, however, that these DA and RA assignments need not be continuous. In fact, the forward link transmission can indicate to the UT community when such channels are available to DA and RA (e.g., 1 minute out of every 10 minutes), and when they are assigned to PA service.

c. Previous discussions indicated that range ordering of UT transmissions would prevent two distinct transmissions from overlapping, and mutually interfering, in the time vicinity of when the actual hops occur. This range ordering permits each UT transmission to fully use the allocated 66⅔ ms per hop. As shown in FIG. 6, system robustness can be enhanced by introducing a few "guard bits" at the beginning and end of each hop; the associated data loss is very small, as illustrated below.

Figure 7:
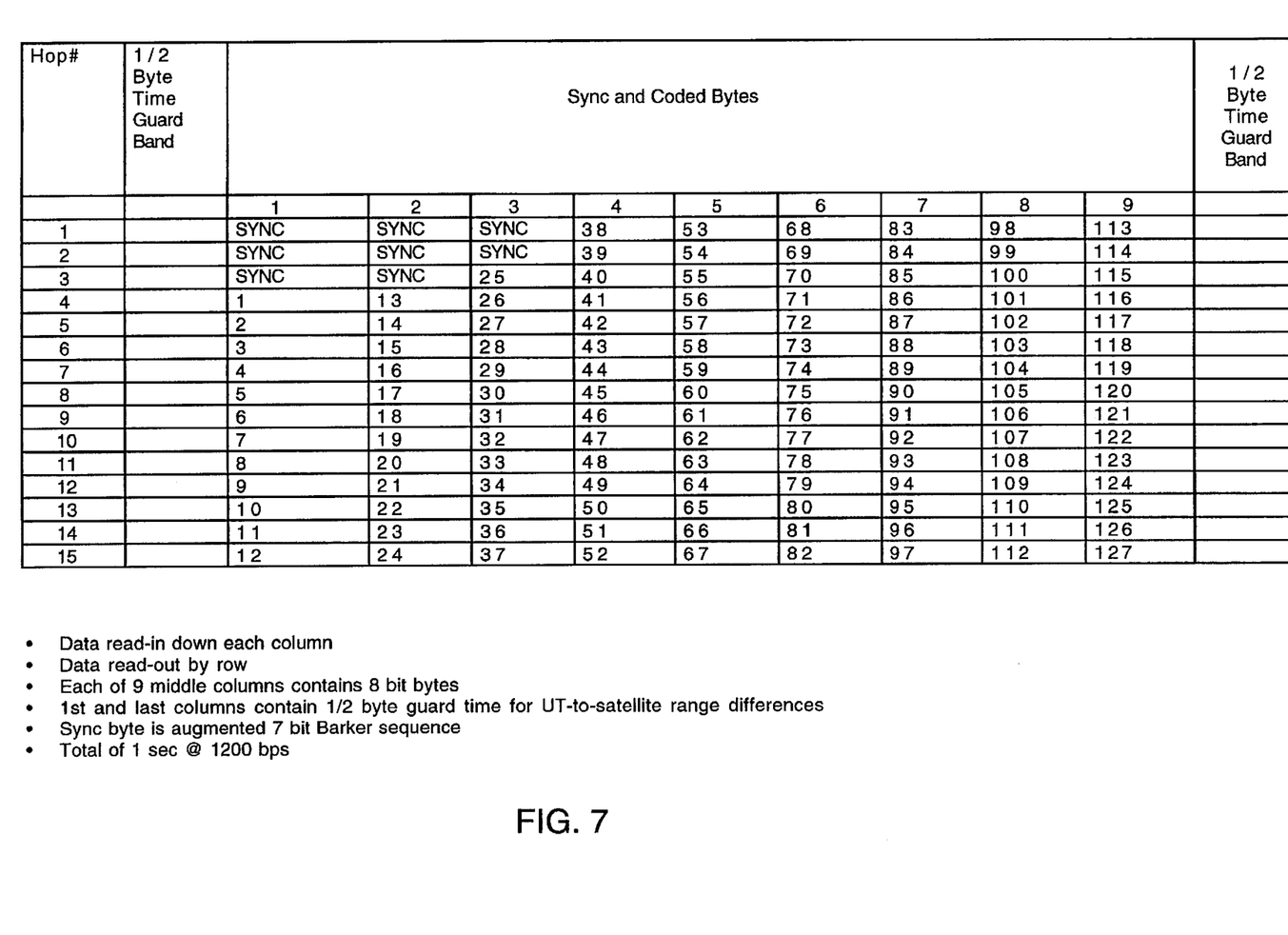

An important aspect of this invention is the manner in which the data and FH hops are integrated into a data block structure that, for the example under consideration, reflects a 1 second data frame on both the forward and return links. This aspect is illustrated in FIG. 7, which describes a specific 1 second block interleaver structure, that is largely applicable to the forward and return links. Important features are as follows:

1. The number of rows and columns is a function of the specific application and forward error correction coding (FEC) scheme employed. Considerable flexibility is available in establishing a block structure. For the present example, the block consists of 15 rows and 10 columns, with the underlying structure based on 8 bit byte, due to the use of Reed-Solomon (RS) coding. In other applications—e.g, wherein convolutional coding and Viterbi decoding is used—the underlying structure would be based on bits rather than bytes, and the block dimensions would be tailored to the memory span of the decoder (e.g, the number of rows might equal 5 constraint length memory span of the Viterbi decoder).

2. For the block interleaver of interest, data is read-in by column and read-out by row, and each row is encompassed in a single frequency hop. For the present example, 127 bytes of data are contained in the shown block, with additional byte locations used for synchronization and guard time. The utilization of block interleaving and FH in this manner measures that, over the satcom channel of interest, each row of data is affected in a statistically independent fashion by a frequency selective fading channel (whether the UT is stationary or moving). Furthermore, the fact that receiver processing performs the reverse deinterleaving, process, the separation of successive bytes—of the original message—by 9 channel bytes introduces additional statistical diversity, which would be particularly beneficial under dynamic channel conditions (e.g., if the UT or the satellite is moving). As such, the integration of FH and interleaving in the message structure of this invention inherently provides multipath mitigation for both stationary and mobile users.

3. The message structure also explicitly integrates synchronization and guard time. For the example shown, the first three rows include a total of 8 bytes of synchronization. This is especially important for operational scenarios of interest, wherein UT's will transmit very short bursts of data, such as the 1 second bock shown here. As such, a mechanism must be built into the message structure to provide raid, robust synchronization, and to indicate the precise instant at which the receiver must begin "filling-in" the block deinterleaver. Furthermore, because the channel of interest may be degraded by multipath, sync bytes must be included over several frequency hops, to sufficiently enhance the probability of sync detection; the present example includes sync bytes over the first three hops, which thus provides three-fold diversity in sync detection. Also to be noted is the use of ½ byte of guard time at the beginning an end of each row. For precise range-ordering of users on the return link, or for the single forward link channel, such guard-time is not mandatory, but operational flexibility in scheduling UT transmissions is enhanced by incorporating such small guard intervals (at the price of a 10% reduction in data throughput, which is generally very acceptable for scenarios of interest).

Figure 8:
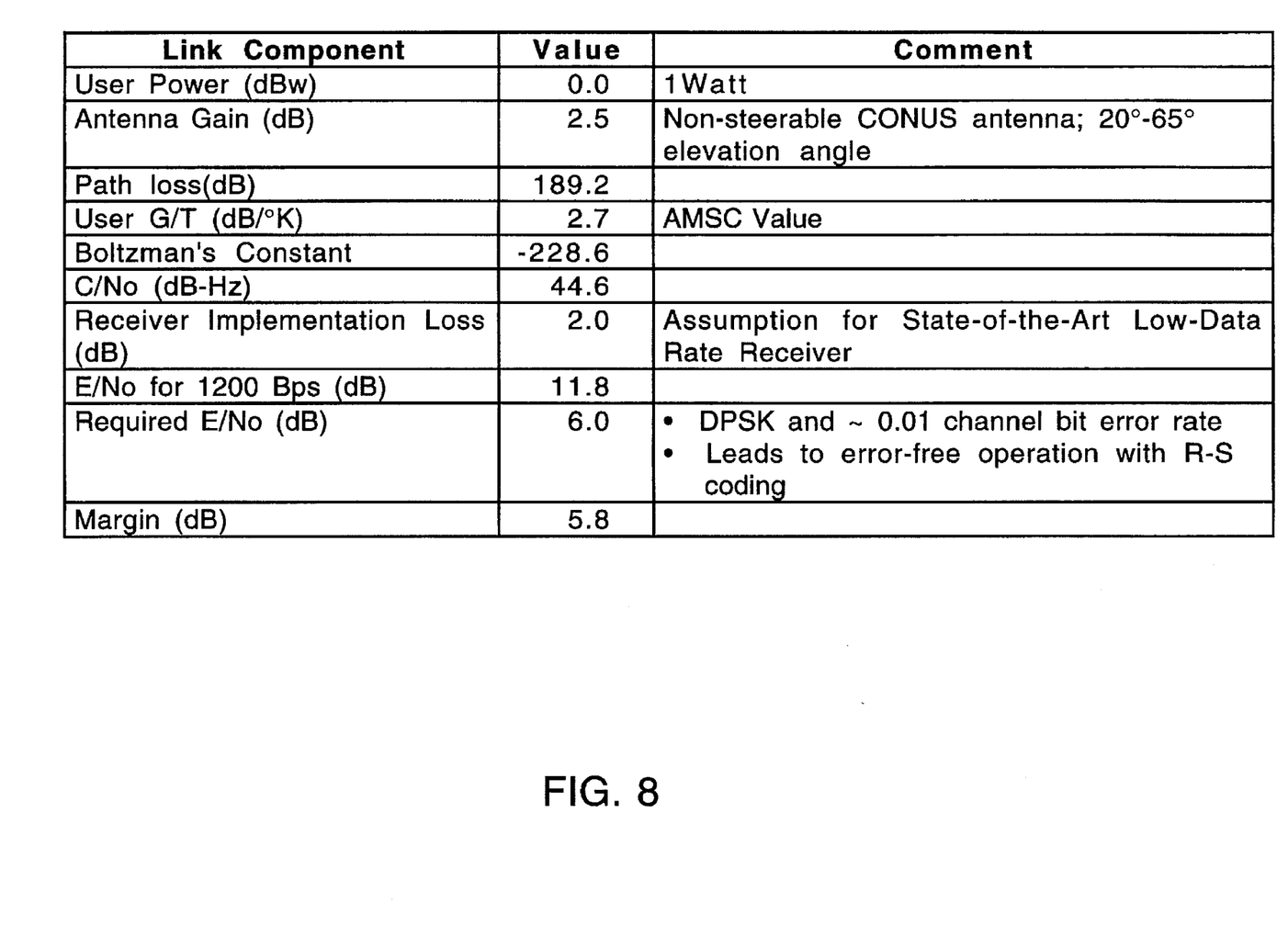

4. Forward error correction (FEC) is explicitly integrated into the FH message structure, and the combination of FEC and FH are synergistically employed to mitigate channel multipath. For the present example, the time duration of the entire block is 1 second. For a channel bit rate of 1200 bps, this corresponds to 1200 bits or 150 bytes—hence the 10×15 size of the block. In accordance with FIG. 7, the number of information bytes—after sync and guard time is removed—is 127, which precisely corresponds to an attractive block length for a R-S code. Within this block length, considerable flexibility exists in selecting the number of information bytes, with the specific number of a compromise between actual information throughput and error correction capability. For example, for a typical information quantity of 64 bytes, the 127 block length has the ability to correct for more than 30 byte errors. This is profound, since within this FH framework, such a structure would permit significant channel degradation of ~25% of the frequency hops and still lead to 100% correct decoding of the desired information. As such, the FH and FEC structures are synergistically employed in this invention to provide a particularly powerful capability for mitigating multipath. Note that without the FH, much of the FEC utility would be lost if the UT is transmitting at a single frequency that reflects a deep fade. Similarly, without the FEC, the channel bit error rate may be unacceptably high, given that some of the hopped information might be lost. In this regard, a useful example is provided by the illustrative return link power budget shown in FIG. 8, which leads to a 0.01 channel bit error rate prior to R-S decoding, and under nominal, non-multipath conditions. Without FEC, such an error rate would be unacceptable, even in the absence of multipath. With FEC, but without FH, the channel bit error rate may be much higher if the fixed operational frequency is heavily faded. The combination of FH and FEC, however, leads to essentially a zero error rate, even if 25% of the frequency hops are heavily faded.

In concluding this discussion, it should be emphasized that the above discussion relates to a specific example. The invention, however, is much more general, and the number of frequency hops, the interleaver structure, the coding scheme, and the modulation scheme, will generally be tailored to the specific application.

TRANSCEIVER FUNCTIONAL DESCRIPTION

This provides insight into user terminal UT and gateway transceiver functionality required to implement the function and capabilities described above. At the outset it would be noted that advances in analog and digital technology provide considerable implementation flexibility at low power and low cost levels not feasible until recent years.

Figure 9:
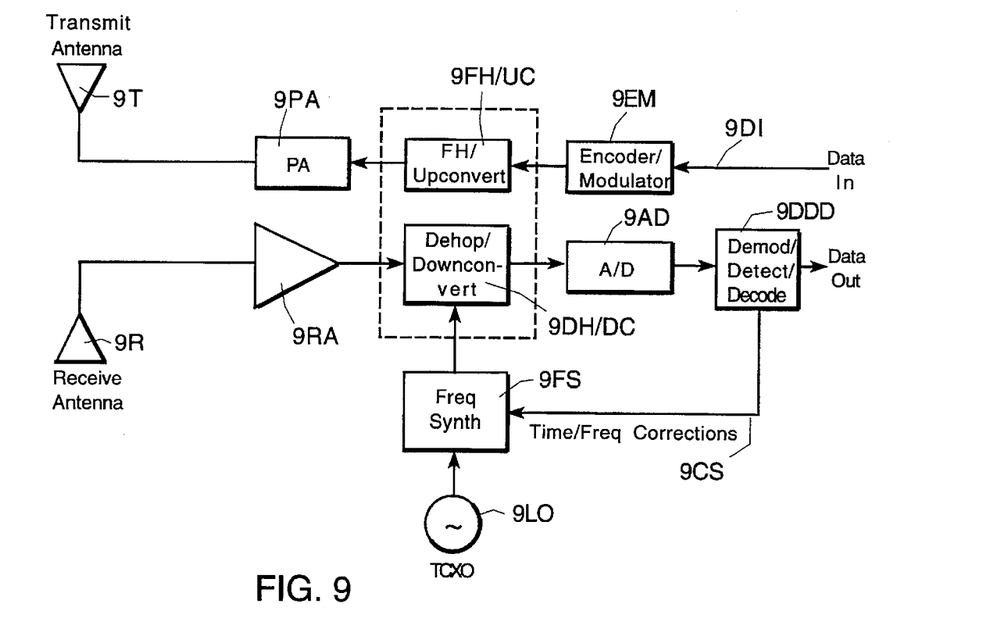
FIG. 9 illustrates representative user transceiver functional block diagrams.

1. FIG. 9 presents an overview of the integrated transceiver, which is applicable to both the user terminal UT and gateway CG, and explicitly emphasizes the frequency hopping FH, modulation and demodulation functions. Data in 9D1 is encoded in encoder/modulator 9EM, frequency hopped and up-converted in unit 9FH/UC, poer amplifier 9PA and broadcast by transmit antenna 9T. Signals received on receive antenna 9 are amplified by amplifier 9RA dehopped and downconverted in converter 9DH/DC, converted from analog-to-digital in converter 9AD. The digital signal is then demodulated detected and decoded in 9DDD with data out being supplied to a user or utilization device. Frequency synthesizer 9FS is driven by digital oscillator 9LL, and receiver correction signal 9CS for synchronization. FIG. 9 also explicitly illustrates the utilization of separate antennas for transmit and receive. This antenna utilization is a key ingredient of this invention, in that it leads to attractive gain (~5 dB), via two small patch antennas, over an attractive elevation angle range (e.g., 20° to 65°, which is applicable to all of continental U.S. (CONUS) that also inherently contributes to multipath mitigation. Also significant is that the use of such dual antennas eliminates the need for a diplexer or a switch, thereby cost-effectively eliminating passive losses and enhancing performance. The remaining figures provide additional details.

Figure 10:
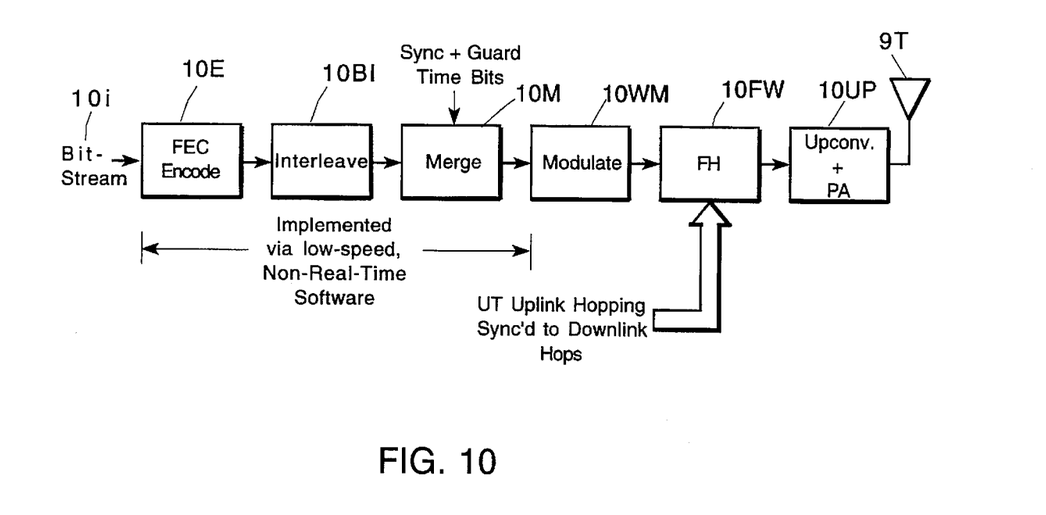
FIG. 10 is a functional block diagram of a preferred embodiment transmitter.

2. The transmitter functional description is shown in FIG. 10.

a. The incoming information data stream 10-i is first FEC encoded 10E, with the FEC unique to the specific application. In the above example, R-S FEC was employed. In other scenarios convolutional or other coding may be used, or appropriate concatenated coding (e.g., R-S with convolutional) may be employed. The FEC encoded data is then block interleaved 10BI and merged 10M with the required synchronization and guard-time bits. Note that for the applications of interest to this invention, both the information rate and the duty cycle are low. As a consequence, the FEC, interleaving, and merging may be accomplished in non-real-time software in the transceiver's digital signal processor (DSP); this ensures simplicity, programmable flexibility, reduced hardware, and low-power consumption.

b. The remaining transmitter functions shown, which are implemented in hardware, include waveform modulation 10WM, frequency hopping 10 FH, frequency conversion to the proper radio frequency, and power amplification 10 UP. The modulation is extremely flexible, and may be tailored to the specific application and operational environment. The example above addressed differential PSK (DPSK), but the modulation may span coherent, noncoherent, and differentially coherent, and use binary, quaternary, or higher alphabet sizes. It should also be noted in FIG. 10 that for the FH function 10 FH, the UT would synchronize its frequency hops to the received forward link hopping. The gateways, on the other hand, would originate the hopping pattern and timing based on its local, highly stable clock reference.

Figure 11:
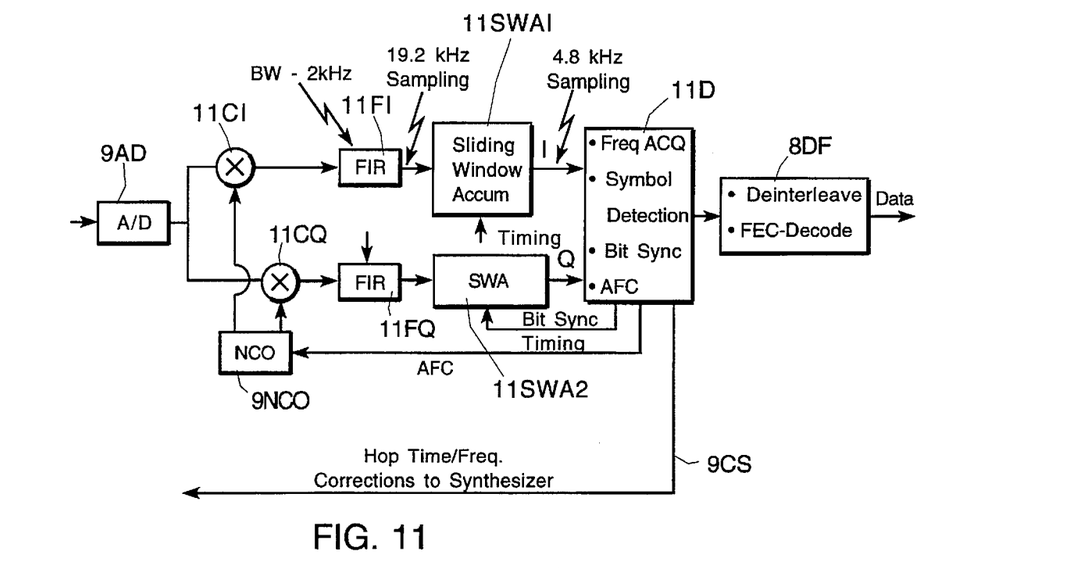
FIG. 11 is a functional block diagram of a preferred embodiment of the demodulator/detector/decoder.
Figure 12:
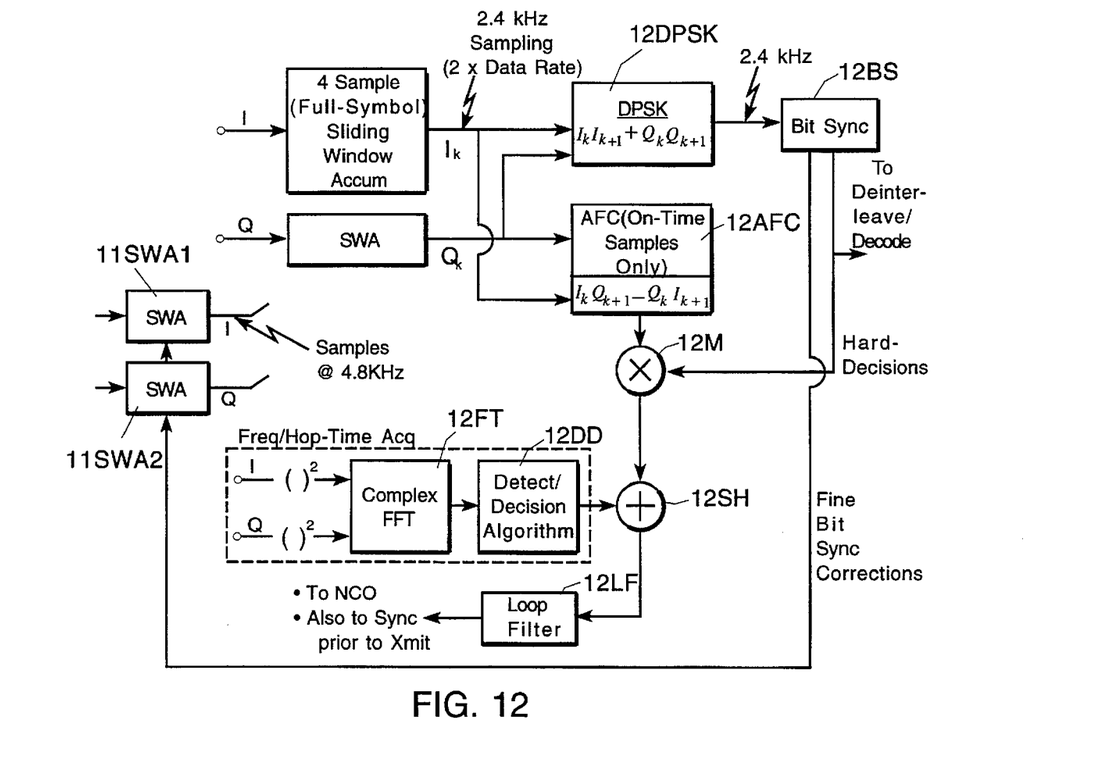
FIG. 12 is a functional block diagram of the additional receiver signal processing functions.

3. As shown in greater detail in FIG. 11, the in-phase (I) and quadrature (Q) signal channels from multipliers 11CI and 11CQ are filtered in FIR filter 11FI and 11FQ (having a bandwidth of about 2 kHz) with a 19.2 kHz sampling rate sliding window accumulator 11SW1 and 11SW2 and supplies in-phase and quadrature signals to detector 11D which provides frequency acquisition, symbol detection, bit sync, and FFC. The bit sync and timing signals are used to control the sliding window accumulators, the FEC signal signal is used to control the number control oscillator 9NCO and the hop time/frequency correction signals are fed to frequency synthesis 9FC. The out signals from detector 11D are to deinterleaver and decoder 11DF which output data to the user or a utilization device at the central data collection facility. FIG. 11 focuses on the digital signal processing functions of the receiver that follow dehopping, downconversion, and A/D conversion of input data signals from the sources described earlier. The bandwidth and sampling rate values are illustrative, and reflect the 1200 bps scenario example described in the previous section. Noteworthy is that all the functions shown, that follow the A/D converter 11AD, may be implemented on a single, low-power application specific integrated circuit (ASIC).

a. The finite impulse response (FIR) filters perform very narrowband filtering, tailored to the channel of interest (e.g., to eliminate adjacent channel interference). This, combined with the sliding window integrator (SWA) 11SWA1 provides matched filtering over a fraction of the information bit (in this case, ¼ of the bit duration). The sliding window function is further driven by the bit synchronizer function to ensure highly accurate bit timing. The in-phase (I) and quadrature (Q) outputs of the SWA's are the key inputs to the algorithmic processing block shown, which performs all the acquisition, tracking and detection functions. The detected output data is then deinterleaved and decoded.

b. A more detailed description of the algorithmic processing block 110 is shown in FIG. 12. The lower portion illustrates the use of Fast Fourier Transform (FFT) 12 FT techniques to rapidly and accurately acquire frequency. Once acquisition takes place the FFT is disabled and processing is transferred over to the symbol detection and carrier tracking functions. Illustrated in FIG. 12, as an example, is the joint implementation of 12 DPSK and automatic frequency control 12AFC (AFC). The significant feature emphasized here is the efficient use of the I and Q samples, provided by the sliding window accumulators 11SWA1, 11SWA2, in implementing all the acquisition and tracking functions. This applies as a general rule, regardless of the modulation used. As illustrated, the 2.4 kHz output of the DPSK is applied to bit sync circuit 12BS which outputs a signal to the deinterleaver decoder 11DF and correlator 12M, which in turn, outputs its signal to summer 12SU. The output of summer 12SU is fed back through loop filter 12LF to the NCO 9 NCO and is also used to synchronize prior to transmitting.

ADVANTAGES OF THE INVENTION MAY BE SUMMARIZED AS FOLLOWS:

1. An improved satellite communication system that primarily focuses on data collection applications, and uniquely employs a novel signal approach not addressed to date by any other proposed commercial satcom system. Unique satellite system features include the following:

2. Asymmetric data communications. The principal emphasis is on data transfer from a large community of users. In other words, many user-to-satellite channels are employed for data transfer, while very little data need be transmitted to each user.

3. Broad applicability. The system is applicable to arbitrary satellite orbits, and supports communications with stationary or mobile users, under highly diverse environmental conditions (i.e., urban, rural, suburban), which encompass both frequency-selective and flat fading multipath conditions.

4. Unique waveform that inherently provides diversity, multipath protection, and overall robustness. The radio frequency (RF) waveform uniquely combines: slow frequency hopping (FH), block interleaving, and forward error correction (FEC). Note that FH has not been proposed by any other emerging satcom system filed. Also, substantial interleaving is not employed in other systems to avoid objectionable processing delays for voice communications; for the data communication scenario here, the associated processing delay (e.g, on the order of 1 second) is of no consequence.

5. Bandwidth efficiency. The proposed FH signaling is a form of spread spectrum that, as noted above, provides multipath protection (as does DS/CDMA). In addition, however, the proposed FH approach provides spectral efficiency that very closely approaches that of ideal SCPC/FDMA; this is a distinct advantage relative to DS/CDMA and provides higher user capacity.

6. Flexible modulation. The above waveform of interest may employ virtually any modulation approach—coherent, noncoherent, or differentially coherent—with the specific modulation tailored to the specific application. For example, for particularly low-cost, short-burst transmissions, differential modulation may appropriately provide the proper compromise between transmit/receive simplicity and signal-to-noise ratio efficiency.

7. Range ordering of users. The operations concept incorporates a unique range-ordering of users, so that all users who are simultaneously transmitting reflect nearly identical user-to-satellite range. This ensures that the frequency hopped signals of simultaneously transmitting users do not overlap, thereby minimizing inter-hop guard times, thus enhancing data throughout and spectral efficiency.

8. Low complexity FH synchronization. The user transmission hopping rate is exactly equal to the hopping rate of the satellite downlink transmission. The system provides a continuous downlink satellite transmission, which permits the user to efficiently synchronize to the downlink hopping pattern, and uses the downlink hopping epochs as the epochs for uplink hopping. This eliminates the need for the user to maintain an accurate hopping clock, and when coupled with the above range ordering, ensures that two simultaneous user transmissions, with distinct hopping patterns, will not overlap and therefore not interfere.

9. Flexible operations. The proposed FH scheme provides time slots to users that can be preassigned or demand assigned. Random access can also supported, based on the FH synchronization approach noted in item 7, above.

10. Tracking can be integrated. The proposed system can combine both communications and accurate tracking via the integration of a commercial GPS receiver.

11. Small, non-steerable, separate transmit/receive antennas on the user terminal, that provide gain and highly attractive user-to-satellite directivity. For user CONUS operations the antenna of interest provides highly attractive 5 dB of antenna gain, within an elevation angle contour of 20° to 65°. This eliminates the need for antenna steering, and further provides mitigation against multipath that is typically received at lower elevation angles. In addition, the user of separate transmit/receive antennas, for the half-duplex operational modes of interest to this invention, eliminates the need for a diplexer or a switch, thereby eliminating passive losses and further reducing cost. Furthermore, for areas outside of CONUS, or for other scenarios which require different operational elevation angles, the antennas of interest can be mounted to provide any "swath" of 45° elevation angles (e.g., between 45° and 90°).

12. All of the above is accomplished via low complexity operations and low complexity user transceiver.

It will be appreciated that there has been shown and described a preferred embodiments of the invention and it will be appreciated that various other embodiments, modifications and adaptations of the invention will become readily apparent to those skilled in the art. It is intended that such other obvious adaptations and modifications be incorporated within the true spirit and scope of the claims appended hereto.

What is claimed is:

1. A reliable, power efficient and cost-effective satellite radio communication system for providing communication between one or more service centers and an ensemble of fixed and mobile user terminals, comprising, in combination:

one or more earth orbiting satellites, each satellite having transmitter means forming a down-link channel, including means to slow frequency hop said down-link channel with a set of frequency hopping frequencies, and a multibeam antenna system with a single channel per beam to time division multiple access broadcast signals to all user terminals covered by each one of said beams, respectively, each said user terminal including transceiver means for receiving one of said down-link channel broadcast from the one of said beams in whose path it lies, and a return link means comprised of a narrow band broadcast channel, means for slow frequency hopping said return-link channel, there being a fixed set of frequencies through which said slow frequency hopping is carried out, said ensemble of fixed and mobile user terminals using the same fixed set of frequency hopping frequencies, and means to mutually synchronize transmissions from each user so that while the ensemble of fixed and mobile user terminals use the same fixed set of frequency hopping frequencies, each user in said ensemble of fixed and mobile user terminals employs a unique frequency at each instant of time.

2. The satellite radio communication system defined in claim 1 wherein said slow frequency hop is at a given rate and the same frequency hopping is used on both forward (up-link) transmission and return (down-link) transmissions are at said given rate.

3. The satellite radio communication system defined in claim 1 wherein each said user terminal transceiver means includes receiver means to derive a frequency hop timing rate from the slow hop frequency of signals received from said satellite.

4. The satellite radio communication system defined in claim 1 including a central data collection (CDC) station radio link coupled to one or more of said earth orbiting satellites, said CDC including means to determine the user terminal to satellite range and schedule transmissions by said user terminals in accordance with said user terminal-to-satellite range, respectively, and including means to transmit said schedule to said ensemble of fixed and mobile user terminals.

5. The satellite radio communication system defined in one of claims 1, 2, 3, or 4, wherein said communication is at selected data rates and, said slow frequency hop is about 10 to 50 Hz for low data rates, and about 0.01 to 0.1 percent of the data rate for high data rates.

6. The satellite radio communication system defined in claim 1 including encoder means for encoding data signals to be broadcast with a forward error correcting code, and block interleaver means for combining the data signals and frequency hop into a data block structure that reflects a data frame on both forward and down-link links.

7. The satellite radio communication system defined in claim 6 wherein said block interleaver means has rows and columns constituting a block including additional locations for synchronization and guard time.

8. The satellite radio communication system defined in claim 6 wherein said frequency hopping has a message structure and said forward error correction encoding of signals to be broadcast is integrated with the frequency hoping message structure and such that the forward error correction code and frequency hopping are synergistically employed to mitigate channel multipath.

9. The satellite radio communication system defined in any one of claims 1–4, and 6 to 8 wherein said transceiver means has an antenna to transmit, and an antenna to receive.

10. A reliable, power efficient and cost-effective satellite radio communication system for providing radio communication between one or more service centers and an ensemble of fixed and mobile user terminals, comprising, in combination:

one or more earth orbiting satellites, each satellite having transmitter means forming a down-link channel, including means to slow frequency hop said down-link channel with a set of frequency hopping frequencies, and a multibeam antenna system with a single channel per beam to time division multiple access broadcast signals to all user terminals covered by each one of said beams, respectively, each said user terminal including transceiver means for receiving one of said down-link channel broadcast from the one of said beams in whose path it lies, and a return link means comprised of a narrow band broadcast channel, means for slow frequency hopping said return-link channel, there being a fixed set of frequencies through which said slow frequency hopping is carried out, said ensemble of fixed and mobile user terminals using the same fixed set of frequency hopping frequencies, and means to mutually synchronize transmissions from each user so that while the ensemble of fixed and mobile user terminals use the same fixed set of frequency hopping frequencies, each user in said ensemble of fixed and mobile user terminals employs a unique frequency at each instant of time, each said service center including a central data collection (CDC) station radio link coupled to one or more of said earth orbiting satellites, said CDC including means to determine the user terminal to satellite range and schedule transmissions by said user terminals in accordance with said user terminal-to-satellite range, respectively, and including means to transmit said schedule to said ensemble of fixed and mobile user terminals.

11. The satellite radio communication system defined in claim 10, wherein said communication is at selected data rates and, said slow frequency hop is about 10 to 50 Hz for low data rates, and about 0.01 to 0.1 percent of the data rate for high data rates.

12. The satellite radio communication system defined in claim 10 including encoder means for encoding data signals to be broadcast with a forward error correcting code, and block interleaver means for combining the data signals and frequency hop into a data block structure that reflects a data frame on both forward and down-link links.

13. The satellite radio communication system defined in claim 12 wherein said block interleaver means has rows and columns constituting a block including additional locations for synchronization and guard time.

14. The satellite radio communication system defined in claim 12 wherein said frequency hopping has a message structure and said forward error correction encoding of signals to be broadcast as integrated with the frequency hoping message structure and such that the forward error correction code and frequency hopping are synergistically employed to mitigate channel multipath.

15. A reliable, power efficient and cost-effective satellite radio communication system for providing radio communication between one or more service centers and an ensemble of fixed and mobile user terminals, comprising, in combination:

one or more earth orbiting satellites, each satellite having transmitter means forming a down-link channel, including means to slow frequency hop said down-link channel with a set of frequency hopping frequencies, and a multibeam antenna system with a single channel per beam to time division multiple access broadcast signals to all user terminals covered by each one of said beams, respectively, each said user terminal including transceiver means for receiving one of said down-link channel broadcast from the one of said beams in whose path it lies, and a return link means comprised of a narrow band broadcast channel, means for slow frequency hopping said return-link channel, there being a fixed set of frequencies through which said slow frequency hopping is carried out, said ensemble of fixed and mobile user terminals using the same fixed set of frequency hopping frequencies, means to mutually synchronize transmissions from each user so that while the ensemble of fixed and mobile user terminals use the same fixed set of frequency hopping frequencies, each user in said ensemble of fixed and mobile user terminals employs a unique frequency at each instant of time including encoder means for encoding data signals to be broadcast with a forward error correcting code, and block interleaver means for combining the data signals and frequency hop into a data block structure that reflects a data frame on both forward and down-link links.

16. The satellite radio communication system defined in claim 15 wherein said frequency hopping has a message structure and said forward error correction encoding of signals to be broadcast is integrated with the frequency hoping message structure and such that the forward error correction code and frequency hopping are synergistically employed to mitigate channel multipath.

* * * * *